United States Patent
Yan et al.

(10) Patent No.: US 7,978,593 B2
(45) Date of Patent: Jul. 12, 2011

(54) METHOD FOR TRANSMITTING CONTROL INFORMATION TO INSTRUCT RECEIVER

(75) Inventors: Fajun Yan, Beijing (CN); Tao Tao, Beijing (CN); Wen Chen, Beijing (CN); Qihong Ge, Beijing (CN); Dong Bai, Beijing (CN); Qinghua Yang, Beijing (CN)

(73) Assignee: Timi Technologies Co., Ltd., Beijing (CN)

( * ) Notice: Subject to any disclaimer, the term of this patent is extended or adjusted under 35 U.S.C. 154(b) by 76 days.

(21) Appl. No.: 12/310,037

(22) PCT Filed: Nov. 24, 2006

(86) PCT No.: PCT/CN2006/003035
§ 371 (c)(1),
(2), (4) Date: Feb. 9, 2009

(87) PCT Pub. No.: WO2008/019536
PCT Pub. Date: Feb. 21, 2008

(65) Prior Publication Data
US 2010/0027695 A1    Feb. 4, 2010

(30) Foreign Application Priority Data
Aug. 9, 2006   (CN) .......................... 2006 1 0089219

(51) Int. Cl.
*H04J 11/00* (2006.01)
(52) U.S. Cl. ......... 370/208; 370/210; 455/136; 455/352
(58) Field of Classification Search .................. 370/208, 370/210; 455/136, 352
See application file for complete search history.

(56) References Cited

U.S. PATENT DOCUMENTS

| | | | |
|---|---|---|---|
| 7,042,858 B1 * | 5/2006 | Ma et al. | 370/331 |
| 7,676,194 B2 * | 3/2010 | Rappaport | 455/11.1 |
| 2003/0043732 A1 * | 3/2003 | Walton et al. | 370/208 |
| 2005/0169166 A1 * | 8/2005 | Okada et al. | 370/208 |
| 2007/0036066 A1 * | 2/2007 | Thomas et al. | 370/208 |
| 2009/0264086 A1 * | 10/2009 | Song et al. | 455/90.2 |

FOREIGN PATENT DOCUMENTS

| | | |
|---|---|---|
| CN | 1214164 A | 4/1999 |
| CN | 1516459 A | 7/2004 |
| JP | 2001-292124 | 10/2001 |

* cited by examiner

*Primary Examiner* — Huy D Vu
*Assistant Examiner* — Amy Haspel
(74) *Attorney, Agent, or Firm* — Kile Goekjian Reed & McManus PLLC

(57) ABSTRACT

A method for transmitting control information to indicate a receiver, comprising following steps: the control information is formed at transmitting side and is encoded based on the working status of the transmitting side of the system; after the encoded control information is mapped, it is multiplexed with other pilot symbol and service load, then an OFDM symbol is generated; the OFDM symbol is transformed from frequency domain to time domain, then a time domain sampling signal is obtained and transmitted to the receiving side of the system; at the receiving side, the time domain sampling signal transmitted by the transmitting side is received and transformed from time domain to frequency domain to form OFDM symbol; the control information is obtained from the valid sub carrier of the OFDM symbol, and the control information is decoded; each work information is extracted form the decoded control information, and the receiving terminal is indicated to execute respective receive process based on the extracted work information. The method can ensure the receiving terminal to receive data based on its own expectation, then reduces the work power consumption of the receiving terminal, and saves the run cost of the digital broadcast system.

2 Claims, 3 Drawing Sheets

METHOD FOR TRANSMITTING CONTROL INFORMATION TO INSTRUCT RECEIVER

TECHNICAL FIELD

The present invention relates to digital information transmission technology, and more particularly, to a method for transmitting control information to instruct a receiver in a multi-carrier digital broadcast system based on OFDM.

BACKGROUND

Besides large coverage and program capacity, digital broadcast has a most excellent characteristic of its broadcast capability which can be point-to-multi-point and point-to-face. And cost of broadcasting information is not related to quantity of users. Thus, as an important component of information communication industry, the digital broadcast technology plays an important role in the construction of information infrastructure and realization of normal service.

In a digital broadcasting system, because of the characteristic of point-to-multi-point during information transmission, the data transmitted in downlink comprises all of user data information. And for the receiver, the data in the downlink has to be received whether it is needed or not. After receiving, the desired data is remained, and the undesired data is discarded. Thus, the receiver has to be working all the time. That is to say, the receiver has to receive the current transmitted data whether it is desired or not, therefore, under these circumstances the receiver needs heavy power consumption. In the case that the receiver is a mobile terminal, the continuous working status thereof leads to increase of power consumption of the mobile terminal (such as mobile phone). And due to the limitations of cell capacity to the mobile terminal's duration of working, the power consumption directly impacts performance of the terminal.

Therefore, a method for selectively receiving data transferred in a digital broadcasting system is needed so that the receiver may receive data as desired to decrease the power consumption of the receiver and save running cost of the digital broadcasting system.

SUMMARY OF INVENTION

An object of some embodiments of the present invention is to provide a method for transmitting control information to instruct a receiver. Based on the method of the present invention, the control information indicating working status of the transmitting side can be defined at the transmitting side, and the control information may be transmitted together with other service data; the receiver at the receiving side may obtain some working status information of the transmitting side by receiving the control information, and performs corresponding receiving process, i.e. receives the data or does not receive the data, based on the working status information.

The method comprises the following steps:

forming the control information at the transmitting side and encoding the control information based on the working status of the transmitting side of the system; mapping the encoded control information and multiplexing it with other pilot symbols and service load to generate OFDM symbol; performing frequency-time domain transform to the OFDM symbol to obtain time-domain sampling signal and transmitting it to the receiving side of the system; receiving the time-domain sampling signal transmitted from the transmitting side at the receiving side of the system and forming the OFDM symbol by time-frequency domain transform; obtaining control information from valid sub carriers of the OFDM symbol and decoding the control information; and extracting each working status information from the decoded control information and instructing the receiver at the receiving side to perform corresponding receive processing based on the each of the extracted working status information.

In the method thereof, the receiver at the receiving side may be a stationary terminal, and it may also be a mobile terminal.

In the method thereof, the control information comprises a time slot number, interweaver synchronization identification, system information compulsive receiving instruction and public information type.

By the method of the present invention, the receiver can be indicated to be effectively processing the received information, thus the method may be used in a digital broadcasting system for decreasing the power consumption of the receiver.

The method according to the present invention has the following advantages:

(1) Control information indicating working status is defined at the transmitting side, which is easy to be performed; the transmitting of the control information is processed together with service data, which is very simple.

(2) By reading the control information, the receiver can extract the working status information of the transmitting side so that the signal transmitted to the receiving side can be appropriately processed, thus effectively decreasing the working duration of the receiver and the power consumption thereof accordingly.

(3) The method can be widely applied to satellite broadcasting, stationary terminal and mobile terminal of terrestrial wireless broadcasting system.

BRIEF DESCRIPTION OF DRAWINGS

The present invention is described but not limited in conjunction with the embodiments shown in the drawings throughout which the similar reference signs represent the similar elements, in which.

DETAILED-DESCRIPTION OF PREFERRED EMBODIMENTS

Figure 1A:
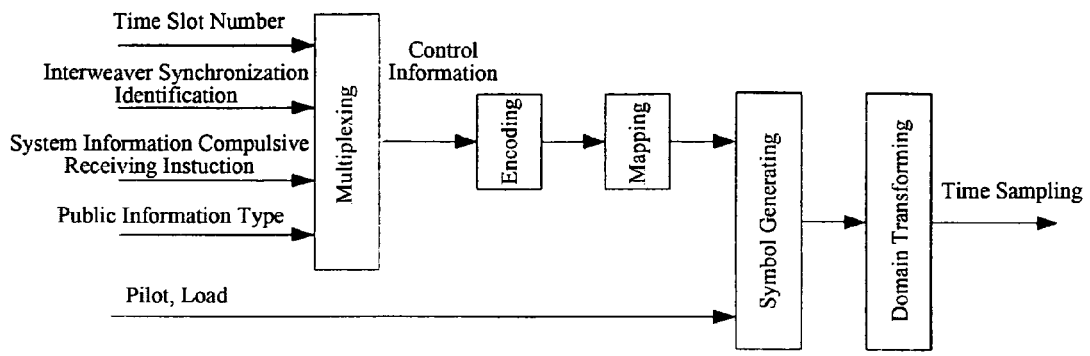
FIG. 1a is a block diagram of data processing at the transmitting side according to the present invention.

The preferred embodiments of the present invention will be described in the following in conjunction with accompanying figures.

The transmission structure of an OFDM-based satellite broadcasting system comprises three layers, i.e., frame, time slot and OFDM symbol. Each frame lasts for 1 second and comprises 40 time slots. Each time slot comprises 53 OFDM symbols. And a time slot, for example time slot 0, is specified as a public broadcast channel by the system for transmitting system information, including system pilot information and service allocation information, and public broadcasting information.

A sampling rate for the broadcasting system is 10 MHz. Via a 4096-point IFFT, 3077 sub-carriers are used within 7.51 MHz bandwidth in which there are 82 continuous pilots, 384 discrete pilots and 2610 load sub-carriers.

The function of 3076 valid sub-carriers and 4096 sub-carriers of the OFDM symbols is as follows, wherein the valid sub-carriers is designated by a(m,n), the OFDM frequency-domain is designated by b(m,n), in which m designates the serial number (0~52) of the OFDM symbol in a time slot, n designates the serial number of the 4096 sub-carriers in the OFDM symbol (including dummy sub-carriers, 0~4096), $$b(m, n) = \begin{cases} a(m, n-1), & 1 \le n \le 1538 \\ a(m, n-1020), & 2558 \le n \le 4095 \\ 0, & n = 0 \text{ or } 1539 \le n \le 2557, \end{cases}, 0 \le m \le 52$$

The 3076 valid sub-carriers are numbered by 0~3075, the continuous pilots uses the 0th, 22th, 28th, 78th, 92th, 168th, 174th, 244th, 274th, 278th, 344th, 382th, 424th, 426th, 496th, 500th, 564th, 608th, 650th, 688th, 712th, 740th, 772th, 846th, 848th, 932th, 942th, 950th, 980th, 1012th, 1066th, 1126th, 1158th, 1214th, 1244th, 1276th, 1280th, 1326th, 1378th, 1408th, 1508th, 1537th, 1538th, 1566th, 1666th, 1736th, 1748th, 1794th, 1798th, 1830th, 1860th, 1916th, 1948th, 2008th, 2062th, 2094th, 2124th, 2132th, 2142th, 2226th, 2228th, 2302th, 2334th, 2362th, 2386th, 2424th, 2466th, 2510th, 2574th, 2578th, 2648th, 2650th, 2692th, 2730th, 2796th, 2800th, 2830th, 2900th, 2906th, 2982th, 2996th, 3052th and 3075th, totally 82 sub-carriers.

The description of the discrete pilot positions are as follows:

m designates the serial number of the OFDM symbol in each time slot, $0 \le m \le 52$; n' is the serial number of the sub-carrier corresponding to the discrete pilot in each OFDM symbol (the sub-carrier here refers to valid sub-carrier, with number 0~3075, the value of n' is as follows:

if mod(m, 2) = 0

$$n' = \begin{cases} 8p+1, & p = 0, 1, 2, \ldots, 191 \\ 8p+3, & p = 192, 193, 194, \ldots, 383 \end{cases}$$

if mod(m, 2) = 1

$$n' = \begin{cases} 8p+5, & p = 0, 1, 2, \ldots 191 \\ 8p+7, & p = 192, 193, 194, \ldots, 383 \end{cases}$$

1+0j is transmitted in all discrete pilots.

The remaining carriers in the 3076 valid sub-carriers except the continuous pilots and the discrete pilots transmit service data.

FIG. 1a is a block diagram of data processing at a transmitting terminal according to the present invention. As shown in FIG. 1a, the data processing at the transmitting terminal comprises the following steps: multiplexing a time slot number, interweaver synchronization identification, system information compulsive receiving instruction and public information type to generate control information; encoding the control information; subjecting the encoded control information to constellation mapping; multiplexing the mapped data with other pilot symbol and service load into OFDM symbol; and performing domain transformation of the OFDM symbol.

The data processing at the transmitting terminal in the digital broadcasting system of the present invention will be described in the following in conjunction with FIG. 1a and other illustrative figures.

The Generation of the Control Information

Firstly, the time slot number, the interweaver synchronization identification, the system information compulsive receiving instruction and the public information type are multiplexed at the transmitting terminal to generate the control information. Each field of the control information is determined by the working status of the transmitting terminal at that time, and the control information may be used to indicate the working status of the transmitting terminal.

The control information has 16 bits comprising the time slot number, the interweaver synchronization identification, the system information compulsive receiving instruction and the public information type (PITy). The time slot number occupies 6 bits, the interweaver synchronization identification and the system information compulsive receiving instruction occupy 1 bit respectively, and the public information type (PITy) occupies 8 bits.

The definition of the control information as listed in table 1.

| Bit | Information |
| --- | --- |
| 0-5 | Time slot number |
| 6 | interweaver synchronization identification |
| 7 | system information compulsive receiving instruction |
| 8-15 | public information type (PITy) |

The field of the time slot number identifies the serial number of the current time slot which ranges from 0 to 39.

The field of the interweaver synchronization identification indicates the starting position of block interweaving, i.e. the starting time slot for block interweaving. The aim of processing the block interweaving is to avoid break out error. The interweaving length of the block interweaving at the transmitting terminal spans a plurality of time slots. If the current time slot is the starting time slot of the block interweaver, the field of the interweaver synchronization identification is "1", otherwise "0". Certainly, the field of the interweaver synchronization identification may also be defined as "0" representing that the current time slot is the starting time slot of the block interweaver.

The field of the system information compulsive receiving instruction identifies whether the system information of the next frame is changed or not. In the broadcasting system, the update frequency of the system information is low. Whether the system information of the next frame is changed or not can be identified by defining the system information compulsive receiving instruction. If changed, the system information in the next frame is received and updated; otherwise, the system information in the next frame will not be received. The system information compulsive receiving instruction is represented by differential modulation. For example, suppose the field of the system information compulsive receiving instruction in the latest frame is "a" (0 or 1), if the system information in the next frame is changed, the system information compulsive receiving instruction in the current frame is inversed to obtain a (1 or 0) to be transmitted and held until it is inversed again when changed next time.

The field of the public information type (PITy) identifies the public information type to be transmitted in the next frame, and there are 0~255 types of public information which can be identified in total. The public information includes emergency information, weather broadcasting, stock information etc. The emergency information means the information to be transmitted to all users when emergency circumstance occurs, and each user shall receive the information compulsively, whereas other public information can be selectively received by the users.

Encoding of Control Information

Next, the control information is encoded to obtain encoded bit stream. The object of encoding lies in insurance of error-free transmission of the control information.

Figure 2:
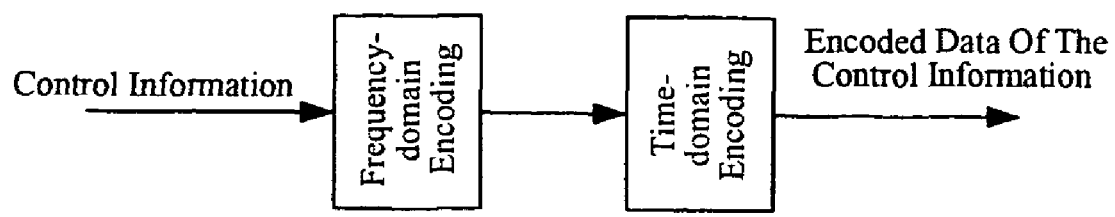
FIG. 2 is a schematic view of a time-frequency domain encoding of control information.

The operation of encoding the control information can refer to FIG. 2. As shown in FIG. 2, the encoded data can be obtained by frequency-domain encoding and time-domain encoding of the control information.

The above 16-bit control information is transmitted via 64 continuous pilots in the 82 continuous pilots in the frequency domain. As described above, the specific positions of the 64 continuous pilots are 22th, 78th, 92th, 168th, 174th, 244th, 274th, 278th, 344th, 382th, 424th, 426th, 496th, 500th, 564th, 608th, 650th, 688th, 712th, 740th, 772th, 846th, 848th, 932th, 942th, 950th, 980th, 1012th, 1066th, 1126th, 1158th, 1214th, 1860th, 1916th, 1948th, 2008th, 2062th, 2094th, 2124th, 2132th, 2142th, 2226th, 2228th, 2302th, 2334th, 2362th, 2386th, 2424th, 2466th, 2510th, 2574th, 2578th, 2648th, 2650th, 2692th, 2730th, 2796th, 2800th, 2830th, 2900th, 2906th, 2982th, 2996th, 3052th. The control information is transmitted via the above 64 continuous pilots using 4-time repetitive encoding mapping. The remaining 18 sub-carriers of the continuous pilots transmit "0". The frequency domain repetitive encoding scheme of the control information is shown in Table 2.

| Bit | Sub-carrier number adopted |
|---|---|
| 0 | 22, 650, 1860, 2466 |
| 1 | 78, 688, 1916, 2510 |
| 2 | 92, 712, 1948, 2574 |
| 3 | 168, 740, 2008, 2578 |
| 4 | 174, 772, 2062, 2648 |
| 5 | 244, 846, 2094, 2650 |
| 6 | 274, 848, 2124, 2692 |
| 7 | 278, 932, 2132, 2730 |
| 8 | 344, 942, 2142, 2796 |
| 9 | 382, 950, 2226, 2800 |
| 10 | 424, 980, 2228, 2830 |
| 11 | 426, 1012, 2302, 2900 |
| 12 | 496, 1066, 2334, 2906 |
| 13 | 500, 1126, 2362, 2982 |
| 14 | 564, 1158, 2386, 2996 |
| 15 | 608, 1214, 2424, 3052 |

Suppose the bits of the 16-bit control information are represented as follows:

$$b(n), 0 \leq n \leq 15$$

The frequency domain encoding is as follows:

$$y(n)=y(n+16)=y(n+32)=y(n+48)=b(n), 0 \leq n \leq 15$$

in which y(n), $0 \leq n \leq 63$ is the 64 continuous pilot sub-carriers carrying information in a symbol, the time-domain encoding is as follows:

$$z(m,n)=y(n), 0 \leq m \leq 52, 0 \leq n \leq 63$$

The z(m,n) represents the value of the $n^{th}$ continuous pilot carrying control information of the $m^{th}$ OFDM symbol in a time slot.

Mapping of the Control Information

Figure 3:
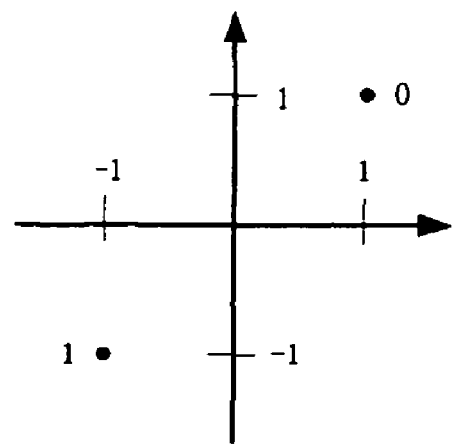
FIG. 3 is a diagram illustrating mapping for BPSK constellation.

FIG. 3 is a diagram illustrating mapping for BPSK constellation.

The encoded control information is mapped to constellation points by BPSK mapping as shown in FIG. 3, a normalization power factor is $\sqrt{2}/2$.

Additionally, it may be understood that the mapping of the control information is not limited to BPSK constellation mapping, other mapping schemes such as QPSK, 16QAM etc. may also be used. However, because the receiving threshold of the BPSK mapping scheme is minimum, the BPSK mapping is adopted in the present embodiment of the invention to ensure the reliable transmission of the control information.

Generation of the OFDM Symbol

Figure 4:
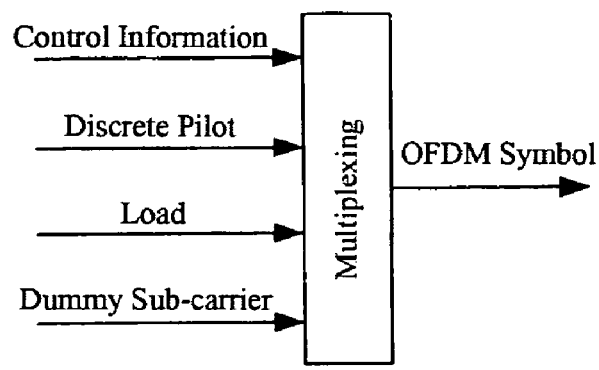
FIG. 4 is a schematic view for generating OFDM symbol.

FIG. 4 is a schematic view for generating OFDM symbol. As shown in FIG. 4, the data of the control information after encoding and mapping and the data of the discrete pilots, service load and the dummy sub-carriers after mapping are multiplexed to be the OFDM symbol.

Time-Domain Transformation of the OFDM Symbol

After the generation of the OFDM symbol, the OFDM symbol generated in the above steps is transformed into time domain. In the embodiment of the present invention, it is achieved by discrete inverse Fourier transform (IFFT), i.e.:

$$s(k) = IFFT[x(n)]$$

$$= \frac{1}{4096} \sum_{n=0}^{4095} x(n) \cdot e^{j2\pi nk/4096}, 0 \leq k \leq 4095$$

in which x(n), $0 \leq n \leq 4095$ represents the information on each sub-carrier of an OFDM symbol and s(k), $0 \leq k \leq 4095$ represents the time-domain sampling signal after the frequency domain signal is transformed to time-domain.

Figure 1B:
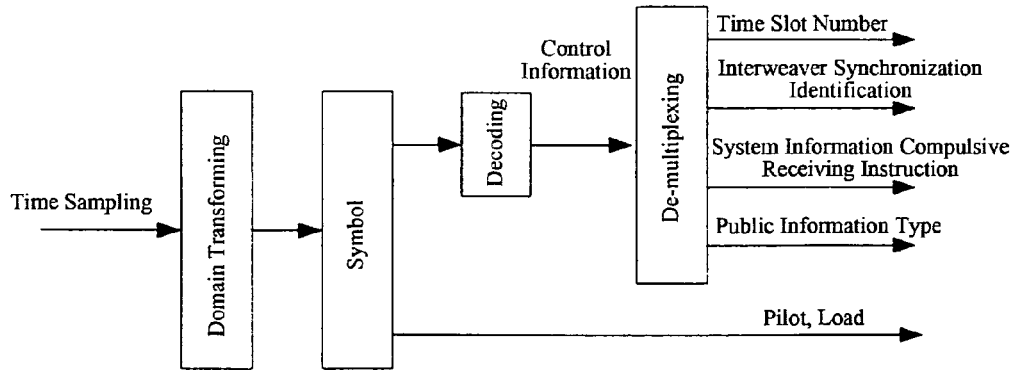
FIG. 1b is a block diagram of data processing at the receiving side according to the present invention.

FIG. 1b is a block diagram of data processing at a receiving terminal according to the present invention. Corresponding to the data processing at the above mentioned transmitting terminal, the processing of the received time-domain sampling signal at the receiving terminal comprises the following steps:

Performing domain transformation to the received time-domain sampling signal to obtain the OFDM symbol; extracting control information from the valid sub-carriers of the OFDM symbol and decoding the control information; extracting the field of time slot number, the field of the interweaver synchronization identification, the field of the system information compulsive receiving instruction and the field of the public information type from the control information after decoding; performing corresponding receiving process by the receiver at the receiving terminal based on the working status of the transmitting terminal indicated by each extracted field.

The following will describe each step of the data processing performed at the receiving terminal in detail in conjunction with FIG. 1b.

Domain Transformation of the Time-Domain Sampling Signal

In the embodiment of the present invention, firstly the time-domain sampling signal received at the receiving terminal is transformed from the time-domain signal into frequency domain based on the discrete Fourier transform (FFT), obtaining the OFDM symbol, and the adopted discrete Fourier transform is as follows:

$$\hat{x}(n) = FFT[r(k)]$$

$$= \sum_{n=0}^{4095} r(k) \cdot e^{-j2\pi nk/4096},$$

$$0 \leq n \leq 4095$$

in which r(k), $0 \leq k \leq 4095$ is the received time-domain sampling signal and $\hat{x}(n)$, $0 \leq n \leq 4095$ is the information on each sub-carrier obtained when the time-domain sampling signal received is transformed into frequency domain.

Extraction of the Control Information

Control information is obtained from the valid sub-carriers of the OFDM symbol from the above steps, specifically:

The constellation points, designated by ẑ(m,n) on the 64 sub-carriers carrying control information, i.e. the 22th, 78th, 92th, 168th, 174th, 244th, 274th, 278th, 344th, 382th, 424th, 426th, 496th, 500th, 564th, 608th, 650th, 688th, 712th, 740th, 772th, 846th, 848th, 932th, 942th, 950th, 980th, 1012th, 1066th, 1126th, 1158th, 1214th, 1860th, 1916th, 1948th, 2008th, 2062th, 2094th, 2124th, 2132th, 2142th, 2226th, 2228th, 2302th, 2334th, 2362th, 2386th, 2424th, 2466th, 2510th, 2574th, 2578th, 2648th, 2650th, 2692th, 2730th, 2796th, 2800th, 2830th, 2900th, 2906th, 2982th, 2996th, 3052th etc., are extracted from the 3076 valid sub-carriers which are channel equalized of the 53 OFDM symbols in a time slot, $0 \leq m \leq 52$ designates the serial number of the OFDM symbol, and $0 \leq n \leq 63$ designates the serial number of the continuous pilots carrying the control information.

Time-Frequency Decoding of the Control Information

Figure 5:
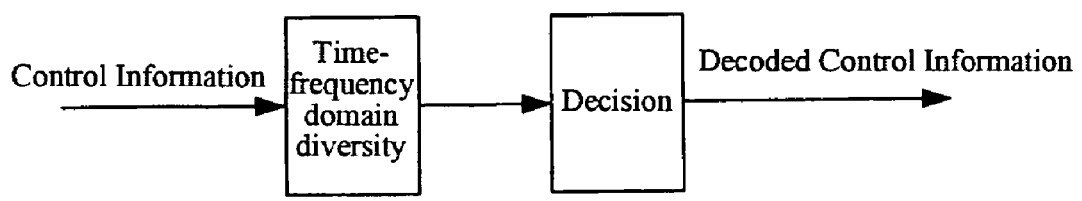
FIG. 5 is a schematic view of a time-frequency decoding of the control information.

Next, the obtained control information is decoded. The time-frequency domain decoding process of the control information is shown in FIG. 5.

The received control information is time-frequency domain diversified, and the above time-frequency domain diversity does not have sequential requirement. The time-domain diversity can be performed firstly, and then the frequency-domain diversity is performed. Also, the frequency-domain diversity can be performed firstly, and then the time-domain diversity. In the embodiment of the present invention, the following description is an example with the time-domain diversity being performed firstly:

$$\hat{y}(n) = \frac{1}{2 \times 53} \sum_{m=0}^{52} [\text{Re}(\hat{z}(m, n)) + \text{Im}(\hat{z}(m, n))]$$

$$0 \leq n \leq 63$$

in which Re[ ] takes a real portion for a complex, and Im[ ] takes a virtual portion for a complex. ŷ(n) is the information on the 64 continuous pilot sub-carriers carrying control information after time-domain diversity.

Then the frequency-domain diversity is performed according to table 2:

$$\hat{b}(n) = \frac{1}{4}(\hat{y}(n) + \hat{y}(n + 16) + \hat{y}(n + 32) + \hat{y}(n + 48))$$

$$0 \leq n \leq 15$$

In which b̂(n) is the soft information of the control information obtained after decoding and de-mapping.

After hard decision on the soft information, the 16-bit control information to be transmitted at the transmitting terminal is obtained. And the specific decision uses the following formula:

$$b_{est}(n) = \frac{1}{2}(1 - \text{sgn}(\hat{b}(n)))$$

in which b̂(n) is the soft information of the control information obtained after decoding and de-mapping, and $b_{est}(n)$ is the bit information after hard decision on the soft information.

Extraction of Each Control Information Field in the Control Information

After hard decision, the 16-bit control information transmitted from the transmitting terminal is restored. The receiver at the receiving terminal extracts each control information field from the above control information to obtain the current time slot number, whether the current time slot is the starting time slot for block interweaving, system information compulsive receiving instruction and the public information type. Based on the system information compulsive receiving instruction in the control information, the receiver can determine whether the system information of the next frame is changed or not. If it is changed, the system information is received. If it is not changed, the system information is not received. The type of the public information of the next frame can be determined based on the public information type instructing information. If it is the type that the receiver concerns, then the public information of the next frame is received, otherwise the public information of the next frame is not received. However, the emergency information transmitted by the system has to be received.

It can be understood that the processing of the receiver may be effectively controlled by the transmission of the control information in the OFDM-based multi-carrier digital broadcasting system, and the working duration of the receiver may be decreased conveniently in addition to the decreasing of power consumption. The method of the present invention may be applied to the fixed terminal and/or mobile terminal in a satellite broadcasting system and a terrestrial wireless broadcasting system.

Although the present invention is described in conjunction with the examples and embodiments, the present invention is not intended to be limited thereto. On the contrary, the present invention obviously covers the various modifications and may equivalences, which are all enclosed in the scope of the following claims.

What is claimed is:

1. A method for transmitting control information to instruct operation of a receiver, the method being used in a OFDM-based multi-carrier digital broadcasting system, wherein the method comprises the following steps: forming the control information at a transmitting terminal based on the working status of the transmitting terminal of the system and encoding the control information; generating an OFDM symbol using a sequence of sub-carriers, wherein the sequence of sub-carriers include a plurality of continuous pilot signals, service load signals, and other pilot signals, wherein the plurality of continuous pilot signals are located at predetermined positions in the sequence of sub-carriers; mapping the encoded control information to the plurality of continuous pilot signals in the OFDM symbol; performing frequency-time domain transform to the OFDM symbol to obtain a time-domain sampling signal and transmitting to the receiving terminal of the system; receiving the time-domain sampling signal transmitted from the transmitting terminal at the receiving terminal of the system and performing the time-frequency domain transformation to obtain the OFDM symbol; obtaining control information from valid sub-carriers of the OFDM symbol and decoding the control information; and extracting each working information from the decoded control information and instructing the receiver at the receiving terminal to perform corresponding receive processing based on each of the extracted working information, wherein the control information is transmitted by mapping it onto the continuous pilots via repetitive encoding mode in the step of forming the control information and encoding thereof at the transmitting terminal, and wherein the OFDM symbol has 3076 sub-carriers and 82 of which are the plurality of continuous pilot signals, which are located at 0th, 22nd, 78th, 92nd, 168th, 174th, 244th, 274th, 278th, 344th, 382nd, 424th, 42 6th, 496th, 500th, 564th, 608th, 650th, 688th, 712th, 740th, 772nd, 846th, 848th, 932nd, 942nd, 950th, 980th, 1012th, 1066th, 1126th, 1158th, 1214th, 1244th, 1276th, 1280th, 1326th, 1378th, 1408th, 1508th, 1537th, 1538th, 1566th, 1666th, 1736th, 1748th, 1794th, 1798th, 1830th, 1860th, 1916th, 1948th, 2008th, 2062nd, 2094th, 2124th, 2132nd, 2142nd, 2226th, 2228th, 2302nd, 2334th, 2362nd, 2386th, 2424th, 246th6,2510th, 2574th, 2578th, 2648th, 2650th, 2692nd, 2730th, 2796th, 2800th, 2830th, 2900th, 2906th, 2982nd, 2996th, 3052nd, 3075th positions of the sequence of sub-carriers respectively.

2. The method according to claim 1, wherein continuous pilots signals located at 22nd, 78th, 92nd, 168th, 174th, 244th, 274th, 278th, 344th, 382nd, 424th, 426th, 496th, 500th, 564th, 608th, 650th, 688th, 712th, 740th, 772nd, 846th, 848th, 932nd, 942nd, 950th, 980th, 1012th, 1066th, 1126th, 1158th, 1214th, 1244th, 1276th, 1280th, 1326th, 1378th, 1408th, 1508th, 1537th, 1538th, 1566th, 1666th, 1736th, 1748th, 1794th, 1798th, 1830th, 1860th, 1916th, 1948th, 2008th, 2062nd, 2094th, 2124th, 2132nd, 2142nd, 2226th, 2228th, 2302nd, 2334th, 2362nd, 2386th, 2424th, 246th6, 2510th, 2574th, 2578th, 2648th, 2650th, 2692nd, 2730th, 2796th, 2800th, 2830th, 2900th, 2906th, 2982nd, 2996th, and 3052nd of the sequence of sub-carriers are transmitted using 4-time repetitive encoding mapping.

* * * * *